J. H. WAGENHORST.
WHEEL WITH TIRE CARRYING FLANGE.
APPLICATION FILED JAN. 25, 1919.
1,316,605. Patented Sept. 23, 1919.
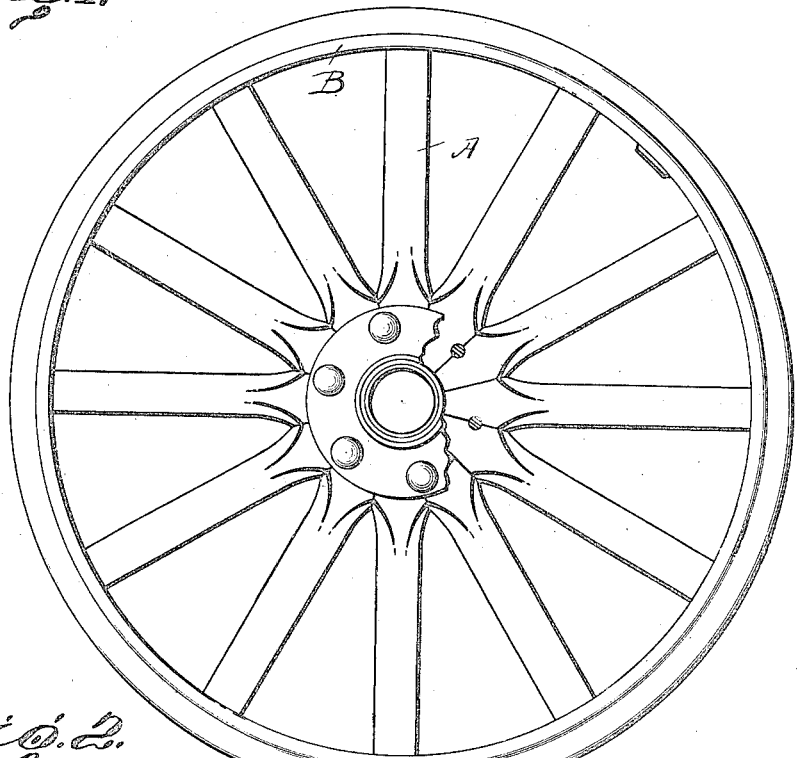
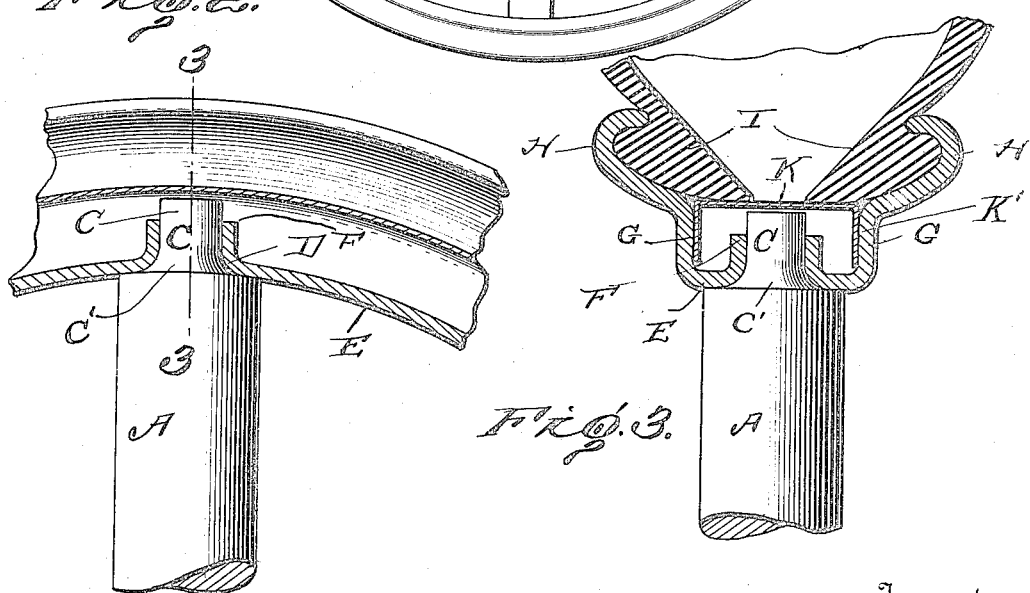
Inventor
J. H. Wagenhorst

UNITED STATES PATENT OFFICE.

JAMES H. WAGENHORST, OF AKRON, OHIO.

WHEEL WITH TIRE-CARRYING FLANGE.

1,316,605.

Specification of Letters Patent.

Patented Sept. 23, 1919.

Application filed January 25, 1919. Serial No. 272,939.

*To all whom it may concern:*

Be it known that I, JAMES H. WAGENHORST, a citizen of the United States, residing at Akron, in the county of Summit and State of Ohio, have invented a certain new and useful Improvement in Wheels with Tire-Carrying Flanges, of which the following is a full, clear, and exact description, reference being had to the accompanying drawings.

This invention relates generally to vehicle wheels and more particularly to one embodying a combination of wooden spokes and a metal rim having integral tire retaining flanges.

The object of the invention is to provide an exceedingly simple, strong and durable wheel of the kind described which can be cheaply manufactured, and which will serve every purpose of the wheels now in common use which embody wooden spokes, a wooden felly and a clencher tire carrying rim connected to said felly.

With this object in view and certain others which will become apparent as the description proceeds, the invention consists in the novel features of construction and combination hereinafter fully described and pointed out in the claims. In the drawings forming a part of this specification:

Figure 1 is a face view of a wheel constructed in accordance with my invention.

Fig. 2 is a detail longitudinal sectional view, a spoke being shown in elevation.

Fig. 3 is a detail sectional view on the line 3—3 of Fig. 2, the spoke being shown in elevation and bead portions of the tire being shown in section in engagement with the rim flanges.

In constructing a wheel in accordance with my invention I employ a plurality of wooden spokes A and a continuous metal rim B. The inner ends of the spokes are made tapering and are brought into engagement with one another to provide the central portion of the wheel body.

The outer ends of the spokes are tenoned as shown at C and these tenons are projected through openings D produced in the base E of the fixed rim, and it will be noted that the metal is carried inwardly as shown at F to provide a reinforcement and it will also be noted that the base of the tenon is made with a fillet C' to fit snugly into the rounded edge of the opening D. The rim is constructed with parallel sides or legs G and integral with the said sides or legs are the tire retaining flanges H which in the drawing are shown of the clencher type although so far as the broad idea of the invention is concerned they may be of any construction desired. In other words the central portion of the rim base is presented inward, this being accomplished by rolling or pressing and imparting to the rim as a whole considerable strength and rigidity. I indicates the bead portions of the tire which engage the flanges H and in order to protect these bead portions and also the inner tube of the tire I arrange within the channeled rim a filler plate K preferably of thin metal and in the form of an inverted channel, the legs K' thereof resting in the channeled portion of the fixed rim or felly. This filler plate can be divided at one point if desired but in practice I prefer to weld the ends of said plate together and if desired this filler can be spot welded to the fixed rim. The channeled filler adds materially to the strength of the rim as a whole and also aids in maintaining its true circular form.

By constructing a wheel in the manner herein shown and described I provide an exceedingly inexpensive wheel body, and at the same time one which is efficient and durable owing to the fact that a very firm connection is had between the spoke ends and also due to the fact that the tire engaging flanges are integral with the rim, and by the employment of the thin metal filler the tire is protected against contact with the ends of the spokes.

What I claim is:—

1. A tire carrying rim for automobile wheels comprising tire retaining flanges and an inwardly extending portion, said inwardly extending portion being apertured, and a channeled filler inserted in said rim, the base of said channeled filler being spaced from the apertured base of the rim.

2. A tire carrying rim for automobile wheels comprising tire retaining flanges and an inwardly projecting central portion, the base of said inwardly projecting central portion being apertured, the edges of said apertures being turned radially outward, and a channeled filler arranged within the rim, the legs of said filler resting upon the base of said inwardly projecting portion.

In testimony whereof, I hereunto affix my signature.

JAMES H. WAGENHORST.